(12) United States Patent
Pacheco et al.

(10) Patent No.: US 8,614,723 B2
(45) Date of Patent: Dec. 24, 2013

(54) APPARATUS AND METHOD FOR INCREASING COMPENSATION SEQUENCE STORAGE DENSITY IN A PROJECTION VISUAL DISPLAY SYSTEM

(75) Inventors: Roman J. Pacheco, McKinney, TX (US); Donald B. Doherty, Richardson, TX (US); Larry D. Dickinson, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 866 days.

(21) Appl. No.: 11/614,105

(22) Filed: Dec. 21, 2006

(65) Prior Publication Data

US 2008/0151195 A1  Jun. 26, 2008

(51) Int. Cl.
  *G06F 3/038* (2013.01)
  *H04N 5/64* (2006.01)
  *G09G 5/10* (2006.01)

(52) U.S. Cl.
  USPC ............. 345/691; 345/204; 345/32; 348/744

(58) Field of Classification Search
  USPC ......... 345/32, 84–85, 204, 691; 348/744–789
  See application file for complete search history.

(56) References Cited

U.S. PATENT DOCUMENTS

| | | | |
|---|---|---|---|
| 4,956,619 A | 9/1990 | Hornbeck | |
| 5,812,303 A * | 9/1998 | Hewlett et al. | 359/298 |
| 6,115,083 A | 9/2000 | Doherty et al. | |
| 6,310,591 B1 | 10/2001 | Morgan et al. | |
| 2002/0149546 A1 * | 10/2002 | Ben-Chorin et al. | 345/32 |
| 2005/0146542 A1 * | 7/2005 | Hewlett et al. | 345/698 |
| 2005/0168454 A1 * | 8/2005 | Bellis et al. | 345/204 |

* cited by examiner

*Primary Examiner* — Kenneth Bukowski
(74) *Attorney, Agent, or Firm* — Warren L. Franz; Wade J. Brady, III; Frederick J. Telecky, Jr.

(57) ABSTRACT

An apparatus for, and method of, increasing compensation sequence storage density in a projection visual display system and a projection visual display system incorporating the apparatus or the method. In one embodiment, the apparatus includes: (1) a memory containing a first compensation sequence portion that is common to a plurality of effective transmission factors and a plurality of second compensation sequence portions that are unique to a corresponding plurality of effective transmission factors and (2) a compensation sequence generator coupled to the memory and configured to construct a compensation sequence for use in the projection visual display system using the first compensation sequence portion and one of the plurality of second compensation sequence portions selected as a function of a particular effective transmission factor.

17 Claims, 4 Drawing Sheets

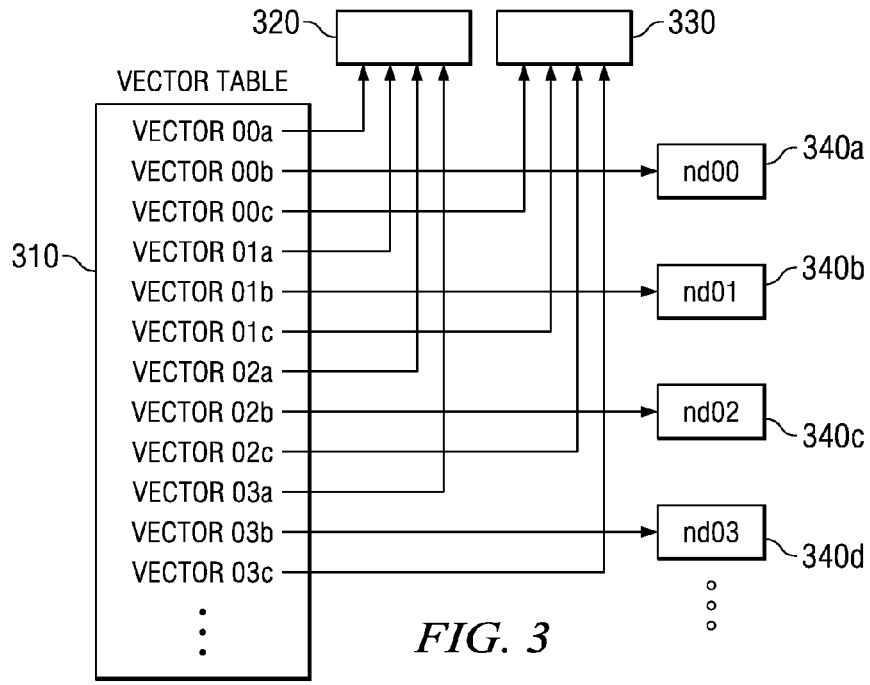
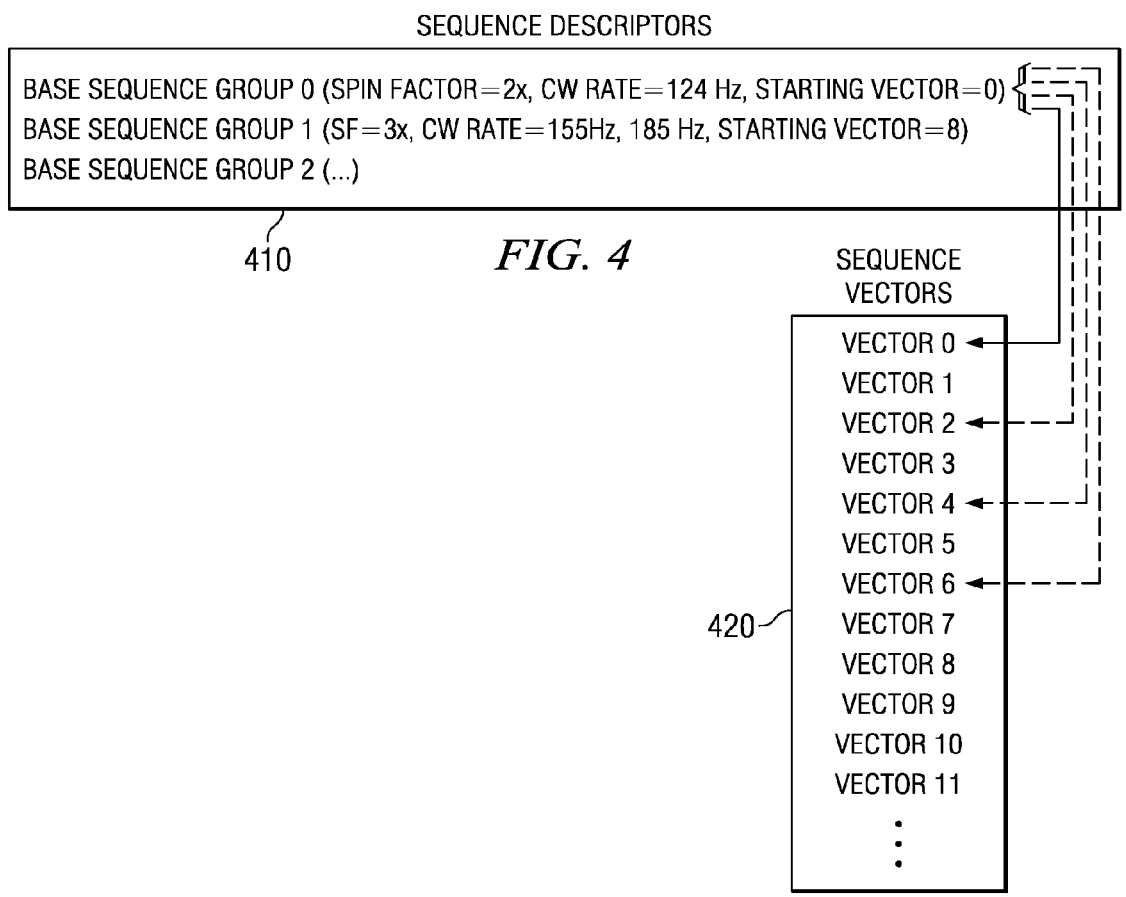

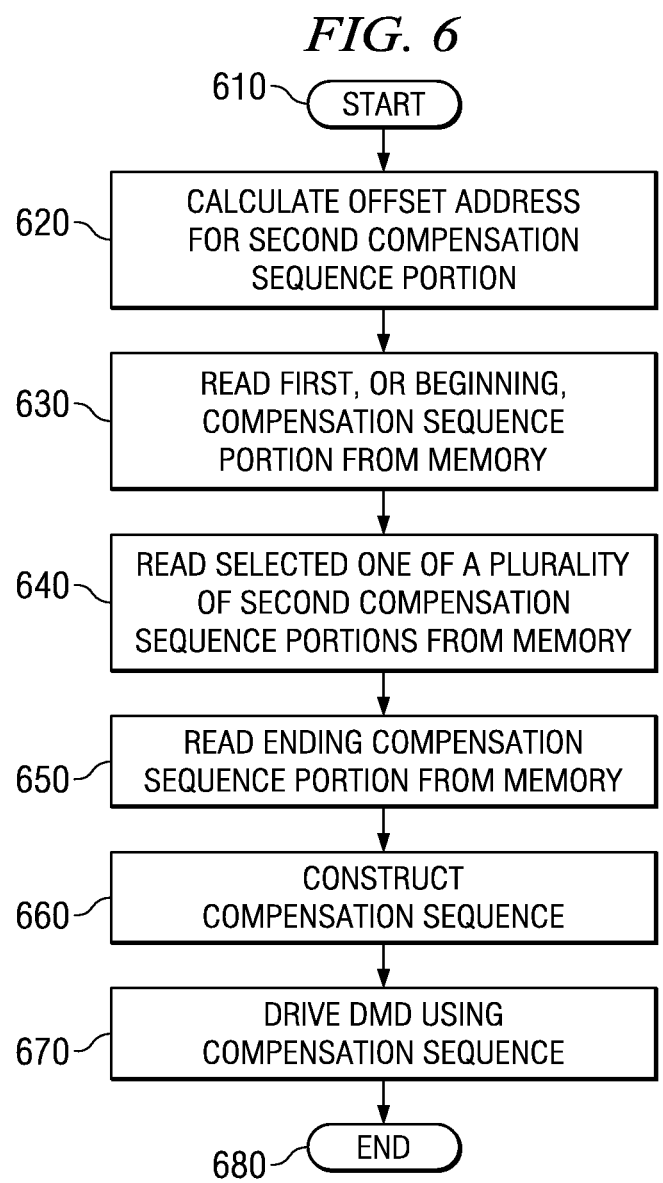

APPARATUS AND METHOD FOR INCREASING COMPENSATION SEQUENCE STORAGE DENSITY IN A PROJECTION VISUAL DISPLAY SYSTEM

TECHNICAL FIELD OF THE INVENTION

The invention is directed, in general, to visual displays and, more particularly, to an apparatus and method for increasing compensation sequence storage density in a spatial light modulator (SLM) projection visual display system.

BACKGROUND OF THE INVENTION

Spatial light modulators (SLMs) are in wide use in displays systems and are increasingly being used because they offer the benefit of high resolution while consuming lower power and being less bulky than conventional cathode ray tubes (CRTs). One type of SLM display is the digital micro-mirror device (DMD). A DMD "chip" typically has an array of small reflective surfaces (mirrors) located on a semiconductor wafer to which electrical signals are applied to deflect the mirrors and change direction of the reflected light applied to the device. A DMD-based display system image is created by projecting a beam of light to the device, selectively altering the positions of individual micro-mirrors with image data, and directly viewing or projecting onto an image plane, such as a display screen, the image produced by light reflected by the selectively altered mirror positions. Each individual micro-mirror is individually addressable by an electronic signal and makes up one "display element" of the image. These micro-mirrors are often referred to as picture elements or "pixels," which may or may not correlate directly to the pixels of an image. This use of terminology is typically clear from context, so long as it is understood that more than one pixel of the SLM array may be used to generate a pixel of the displayed image.

Generally, projecting an image from an array of DMD pixels is accomplished by loading memory cells connected to the pixels. Once each memory cell is loaded, the corresponding pixels are reset so that each micro mirror tilts in accordance with the ON or OFF state of the data in the memory cell. Modulating the beam of light with a micro-mirror is used to vary the intensity of the reflected light, such as through pulse-width modulation (PWM).

Pulse-width modulation (PWM) techniques may be used to achieve varying levels of illumination in both black/white and color systems. For generating color images with SLMs, one approach is to use a single DMD and a color wheel having, in its most basic form, filter segments for generating primary colors (red, green and blue, or "RGB"). Data for different colors is sequenced and synchronized to the color wheel so that the eye integrates sequential images into a continuous color image.

More sophisticated color wheels add a neutral-density (ND) filter segment to the color wheel to increase the effective bit-depth of a color (usually green). The ND segment reduces the amount of light that is transmitted relative to the amount of light transmitted by the corresponding non-ND segment filter for the same color (e.g., non-ND green). This allows smaller bits to be created without having to make bit times too small, resulting in an increased bit-depth.

Most lamps used in DMD systems require a maintenance pulse to stabilize their arc and extend their lifetime. Traditionally, such pulses have been hidden in the "spokes" of the color wheel (the transition point from one color-wheel segment to the next). In cases where this lamp pulse is too large to fit within a color-wheel spoke, the pulse may be placed over the ND segment. Placing the pulse over the ND segment increases the amount of light transmitted by the ND segment.

An "effective transmission factor," which is defined as the product of the ND segment filter transmission and the pulse-to-plateau ratio (PPR) of the pulse over the ND segment, may be used to determine how to compensate for this increase in light. PPR, in turn, is defined as the ratio of the amplitude of the light output during the maintenance pulse to the amplitude of the light output when not pulsed. PWM sequences used in such systems carefully size the bits displayed during the ND portion of the color wheel based on a given effective transmission factor to achieve the desired bitweights. Unfortunately, for many lamps, the plateau drops in amplitude over the life of the lamp, creating an effective increase in PPR. Unless compensated for, severe nonlinearities in the color ramps that use the ND color would result.

Two techniques currently exist for nonlinearity compensation: (1) use compensation Spatial-Temporal Multiplexing (STM) tables to match the increased ND bitweights (see, e.g., U.S. Pat. No. 6,310,591, which issued on Oct. 30, 2001, to Morgan, et al., entitled "Spatial-temporal Multiplexing for High Bit-depth Resolution Displays," incorporated herein by reference) and/or (2) generate a new sequence that keeps the ND bitweights at the target levels by resizing the bits to take into account the new effective transmission factor.

While both techniques can be used for nonlinearity compensation, the second technique is superior, because it allows target ND bitweights to be maintained. Ideally, a new sequence is written for each effective transmission factor reached during the life of the lamp. However, two practical factors make this difficult. First, a point occurs (at a high enough effective transmission factor) at which creating the target bitweight requires an ND bit time that cannot be achieved because it is less than the absolute minimum bit time for the DMD. The only technique for compensation for effective transmission factors above this threshold is to use compensation spatial-temporal multiplexing (STM) tables (the first compensation technique, above) for the increased bit-weights. Second, the amount of memory available limits the number of sequences that can be used for compensation.

Memory requirements become especially large when the system supports multiple color-wheel spin factors (e.g., 2× and 3×), because although the same effective transmission factor range must still be covered, the available memory must be divided between or among sequences for all of the color-wheel rates.

What is needed in the art is a technique for increasing compensation sequence storage density in an SLM system. The technique may be useful for reducing the amount of memory an SLM system requires to provide a certain level of performance or for reducing dither noise that may be associated with the system without requiring more memory for compensation sequences.

SUMMARY OF THE INVENTION

To address the above-discussed deficiencies of the prior art, the invention provides, in one aspect, an apparatus for increasing compensation sequence storage density in a projection visual display system. In one embodiment, the apparatus includes: (1) a memory containing a first compensation sequence portion that is common to a plurality of effective transmission factors and a plurality of second compensation sequence portions that are unique to a corresponding plurality of effective transmission factors and (2) a compensation sequence generator coupled to the memory and configured to construct a compensation sequence for use in the projection visual display system using the first compensation sequence portion and one of the plurality of second compensation sequence portions selected as a function of a particular effective transmission factor.

In another aspect, the invention provides a method of increasing compensation sequence storage density in a projection visual display system. In one embodiment, the method includes: (1) reading from a memory a first compensation sequence portion that is common to a plurality of effective transmission factors, (2) reading from the memory one of a plurality of second compensation sequence portions that are unique to a corresponding plurality of effective transmission factors as a function of a particular effective transmission factor and (3) constructing a compensation sequence for use in the projection visual display system using the first compensation sequence portion and the one of the plurality of second compensation sequence portions.

In yet another aspect, the invention provides a projection visual display system. In one embodiment, the projection visual display system includes: (1) a memory containing a beginning compensation sequence portion that is common to a plurality of effective transmission factors, a plurality of middle compensation sequence portions that are unique to a corresponding plurality of effective transmission factors and an ending compensation sequence portion that is common to the plurality of effective transmission factors, (2) a frame store/format module coupled to the memory and having a compensation sequence generator configured to construct a compensation sequence for use in the projection visual display system using the beginning compensation sequence portion, one of the plurality of second compensation sequence portions selected as a function of a particular effective transmission factor and the ending compensation sequence portion, (3) a digital mirror device and (4) a sequence controller coupled to the frame store/format module and the digital mirror device and configured to drive the digital mirror device based on the compensation sequence.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following description taken in conjunction with the accompanying drawings, in which:

FIG. 3 illustrates a schematic diagram of one embodiment of a sequence architecture associated with the compensation sequence generator of FIG. 2;

FIG. 4 illustrates a schematic diagram of one embodiment of a sequence descriptor architecture associated with the compensation sequence generator of FIG. 2;

FIG. 6 illustrates a flow diagram of one embodiment of a method of increasing compensation sequence storage density and generating a starting vector address in an SLM system carried out according to the principles of the invention.

DETAILED DESCRIPTION

Figure 1:
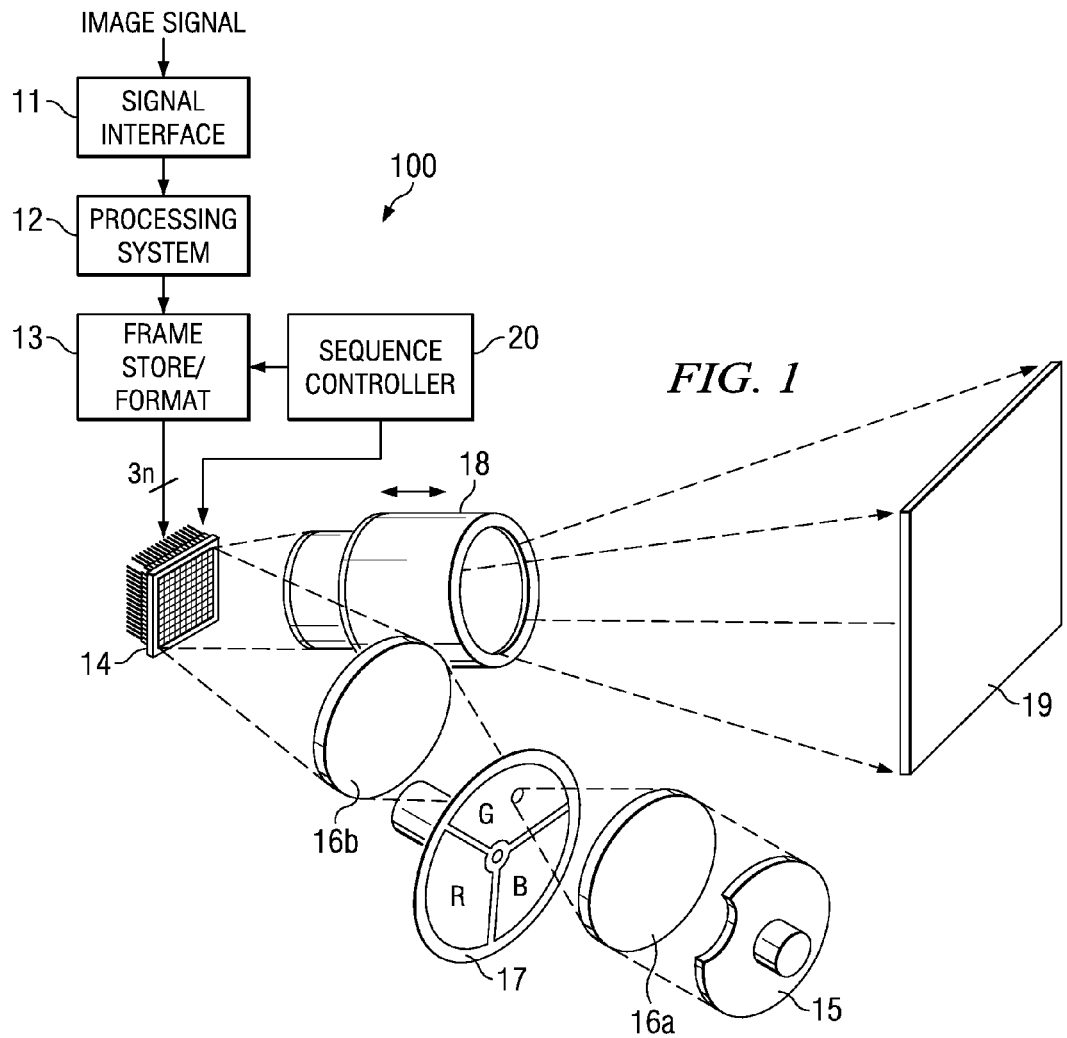
FIG. 1 illustrates one embodiment of a projection visual display system, which uses an SLM having a DMD therein to generate real-time images from an input image signal.

FIG. 1 illustrates one embodiment of a projection visual display system 100, which uses an SLM having a DMD 14 therein to generate real-time images from an input image signal. The input image signal may be from a television tuner, Motion Picture Experts Group (MPEG) decoder, video disc player, video cassette player, personal computer (PC) graphics card or the like. Only those components significant to main-screen pixel data processing are shown. Other components, such as might be used for processing synchronization and audio signals or secondary screen features, such as closed captioning, are not shown for simplicity's sake.

A white light source 15 (or lamp) shines (typically white) light through a concentrating lens 16a, a color wheel 17 and a collimating lens 16b. The light, now being colored as a function of the position of the color wheel 17, reflects off a DMD 16 and through a lens 18 to form an image on a screen 19. The color wheel 17 may simply have red, green and blue segments or, as described above, may include one or more neutral density (ND) segments to increase the effective bit-depth of the projection visual display system 100.

Although space does not allow it to be shown in FIG. 1, the color wheel 17 includes a small ND segment that is green in color ("ND green"). A maintenance pulse having a positive amplitude is provided to the white light source 15 during the ND green segment. Those skilled in the pertinent art will understand, however, that the invention is not limited to color wheels having ND segments, to maintenance pulses during a particular segment or a single segment, or to maintenance pulses having a positive amplitude.

In the illustrated embodiment, the input image signal, which may be an analog or digital signal, is provided to a signal interface 11. In embodiments where the input image signal is analog, an analog-to-digital (A/D) converter (not illustrated) may be employed to convert the incoming signal to a digital data signal. The signal interface 11 receives the data signal and separates video, synchronization and audio signals. In addition, a Y/C separator is also typically employed, which converts the incoming data from the image signal into pixel-data samples, and which separates luminance (Y) data from chrominance (C) data, respectively. Alternatively, in other embodiments, Y/C separation could be performed before A/D conversion.

The separated signals are then provided to a processing system 12. The processing system 12 prepares the data for display by performing various pixel data processing tasks. The processing system 12 may include whatever processing components and memory useful for such tasks, such as field and line buffers. The tasks performed by the processing system 12 may include linearization (to compensate for gamma correction), colorspace conversion and interlace to progressive scan conversion. The order in which any or all of the tasks are performed by the processing system 12 may vary.

Once the processing system 12 is finished with the data, a frame store/format module 13 receives processed pixel data from the processing system 12. The frame store/format module 13 formats the data, on input or on output, into bit plane format by converting the pixel data into a sequence for each pixel and saving the sequences to memory. The bit planes, which are the sequences read in parallel one bit at a time, are delivered to the DMD 14. The bit plane format permits single or multiple pixels on the DMD 14 to be turned on or off in response to the value of one bit of data, in order to generate one layer of the final display image. In one embodiment, the frame store/format module 13 is a "double buffer" memory, which means that it has a capacity for at least two display frames. In such a module, the buffer for one display frame may be read out to the SLM while the buffer for another display frame is being written. To this end, the two buffers are typically controlled in a "ping-pong" manner so that data is continually available to the SLM.

For the next step in generating the final desired image, the bit plane data from the frame store/format module 13 is delivered to the SLM. Although this description is in terms of an SLM having a DMD 14 (as illustrated), other types of SLMs could be substituted into the display system 100. Details of a suitable SLM are set out in U.S. Pat. No. 4,956,619, entitled "Spatial Light Modulator," which is commonly owned with this disclosure and incorporated herein by reference in its entirety. In the case of the illustrated DMD-type SLM, each piece of the final image is generated by one or more pixels of the DMD 14, as described above. Generally, the SLM uses the data from the frame store/format module 13 to address each pixel on the DMD 14. The "ON" or "OFF" state of each pixel forms a black or white piece of the final image, and an array of pixels on the DMD 14 is used to generate an entire image frame. Each pixel displays data from each bit plane for a duration proportional to each bit's PWM weighting, which is proportional to the length of time each pixel is ON, and thus its intensity in displaying the image. In the illustrated embodiment, each pixel of the DMD 14 has an associated memory cell to store its instruction bit from a particular bit plane.

For each frame of the image to be displayed in color, red, green, blue (RGB) data may be provided to the DMD 14 one color at a time, such that each frame of data is divided into red, blue and green data segments. Typically, the display time for each segment is synchronized to an optical filter, such as the color wheel 17, which rotates so that the DMD 14 displays the data for each color through the color wheel 17 at the proper time. Thus, the data channels for each color are time-multiplexed so that each frame has sequential data for the different colors.

Also illustrated in FIG. 1 is a sequence controller 20 associated with the frame store/format module 13 and the DMD 14. The sequence controller 20 provides reset control signals to the DMD 14, as well as load control signals to the frame store/format module 13. An example of a suitable sequence controller is described in U.S. Pat. No. 6,115,083, entitled "Load/Reset Sequence Controller for Spatial Light Modulator," which is commonly owned with this disclosure and incorporated herein by reference in its entirety.

As described above, the invention may (but not necessarily) address two problems. The first is memory requirements. The amount of memory space required for ND lamp compensation sequences may be dramatically reduced. For existing and future applications, this allows the today's level of performance to be maintained while significantly reducing memory space, and therefore cost. The second is dither noise. Dither noise performance may be improved in projection visual display systems in which the number of available sequences is not fixed. The invention can allow a far greater number of compensation sequences to be stored in a given memory space and hence a higher density. Dither noise performance may be enhanced by allowing ND bitweights to be maintained closer to their target values without incurring substantial memory penalties.

In embodiments described herein, only the base sequences for the color-wheel "multiplier groups" (e.g., 2× and 3× spin factor) that the system supports are stored in memory. These base sequences are established for desired ND bitweights at the lowest effective transmission factor of the ND segment. Then, for each of the rest of the effective transmission factors that are supported over the life of the lamp, only the difference from the original, base sequence needs to be stored.

This is in stark contrast to the prior art, in which every compensation sequence is stored as an entire sequence, including portions that are identical to corresponding portions in the base sequence. However, because each compensation sequence differs from the base sequence only in its ND portion, only that portion that needs to be stored. The rest of the sequence may be mapped in a manner to be described such that the original, base sequence data (which does not change with a change in effective transmission factor) is used. The ND portion of the sequence is a relatively small portion of the original sequence and therefore requires very little memory space to store.

In addition, prior art compensation sequences require extra "sequence descriptor" entries in the memory. Sequence descriptors contain information about a sequence, including its location in the sequence code. This information is used during lamp compensation processing to determine the starting sequence vector of a desired compensation sequence. The only difference between a compensation sequence descriptor and the base descriptor is the pointer to the starting vector of the sequence.

In some embodiments of the invention, the compensation sequences are placed in the sequence code immediately following their corresponding base sequences. This eliminates the need for extra sequence descriptor entries as the location of any compensation entry can be determined dynamically given the predefined layout. Once a current effective transmission factor is determined, its corresponding entry is found in the lamp compensation lookup table (LUT), which is used to map from effective transmission factors to the corresponding sequence and STM table to use. The sequence offset found in the lamp compensation LUT may be multiplied by the number of vectors per sequence (i.e., the number of sequence portions per compensation sequence) of the current color-wheel multiplier (found in the base sequence descriptor). This may then be multiplied by the number of frequency bins supported by the current color-wheel multiplier (which is also found in the base sequence descriptor). This final product is added to the starting sequence vector for the base sequence to find the starting sequence vector for the desired compensation sequence. This technique saves additional memory space.

Figure 2:
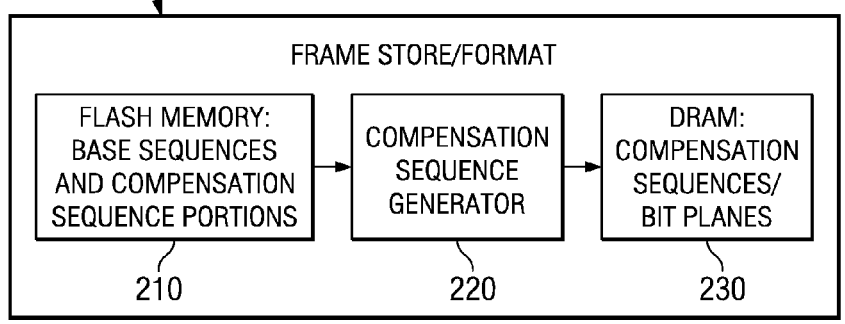
FIG. 2 illustrates a block diagram of the frame store/format module of FIG. 1 that contains one embodiment of an apparatus for increasing compensation sequence storage density in an SLM system constructed according to the principles of the invention.

FIG. 2 illustrates a block diagram of the frame store/format module 13 of FIG. 1 that contains one embodiment of an apparatus for increasing compensation sequence storage density in an SLM system constructed according to the principles of the invention. Although the apparatus is illustrated as being contained in the frame store/format module 13, this need not be the case.

A flash memory 210 contains base sequences and compensation sequence portions in accordance with a sequence architecture that will be described below. A compensation sequence generator 220 is coupled to the flash memory 210. The compensation sequence generator 220 is configured to construct a compensation sequence for use in the projection visual display system using compensation sequence portions read from the flash memory. The constructed compensation sequences are then provided to a dynamic random access memory (DRAM) 230, where they, along with other sequences (not shown) are stored until they are read out in the form of bit planes for the benefit of the DMD 14 of FIG. 1.

FIG. 3 illustrates a schematic diagram of one embodiment of a sequence architecture associated with the compensation sequence generator 220 of FIG. 2. A vector table 310 contains entries that are grouped in threes. For example, the first three entries, Vector 00a, Vector 00b and Vector 00c, form a group of three vectors; the next three entries, Vector 01a, Vector 01b and Vector 01c, form a second group of three vectors. Each group of three vectors points to a complete sequence. Vector 00a points to a beginning compensation sequence portion 320 that is common to a plurality of effective transmission factors. Vector 00b points to a middle (ND) compensation sequence portion 340a that is unique to a particular effective transmission factor. Vectors associated with other groups of three vectors (e.g., Vector 01b, Vector 02b, Vector 03b) point to middle compensation sequence portions that are unique to other particular effective transmission factors (e.g., middle compensation sequence portions 340b, 340c, 340d). Vector 00c points to an ending compensation sequence portion that is common to the plurality of effective transmission factors. In the illustrated embodiment, a compensation sequence can therefore be formed by employing a group of at most three vectors to read and, e.g., concatenate their corresponding portions.

FIG. 4 illustrates a schematic diagram of one embodiment of a sequence descriptor architecture associated with the compensation sequence generator 220 of FIG. 2. Each color wheel multiplier supported in a given projection visual display system (e.g., 2× and 3× spin factor) has a base sequence with a corresponding base sequence descriptor. In certain embodiments of the invention, no descriptors are needed for the compensation sequences. FIG. 4 will illustrate how this may be done.

FIG. 4 shows a sequence descriptor table 410, containing sequence descriptors for base sequence groups, and a sequence vector table 420, containing sequence vectors. For example, a first entry in the sequence descriptor table 410 is a Base Sequence Group 0 pertaining to a wheel spin factor of 2×, a color-wheel spin rate 124 Hz and a starting vector of 0. A solid arrow shows the default starting vector for the base sequence (Vector 0). Three broken-line arrows show how the starting vector can change based on the compensation sequence being used. A sequence lamp compensation LUT (to be illustrated in FIG. 5) references, by means of an offset, the compensation sequence to be used. This offset is advantageously used to generate the starting vector of the compensation sequence by multiplying it by the number of vectors in the current base sequence and further by the number of color wheel rates supported by the current base sequence. The result is added to the base sequence's starting vector.

Figure 5:
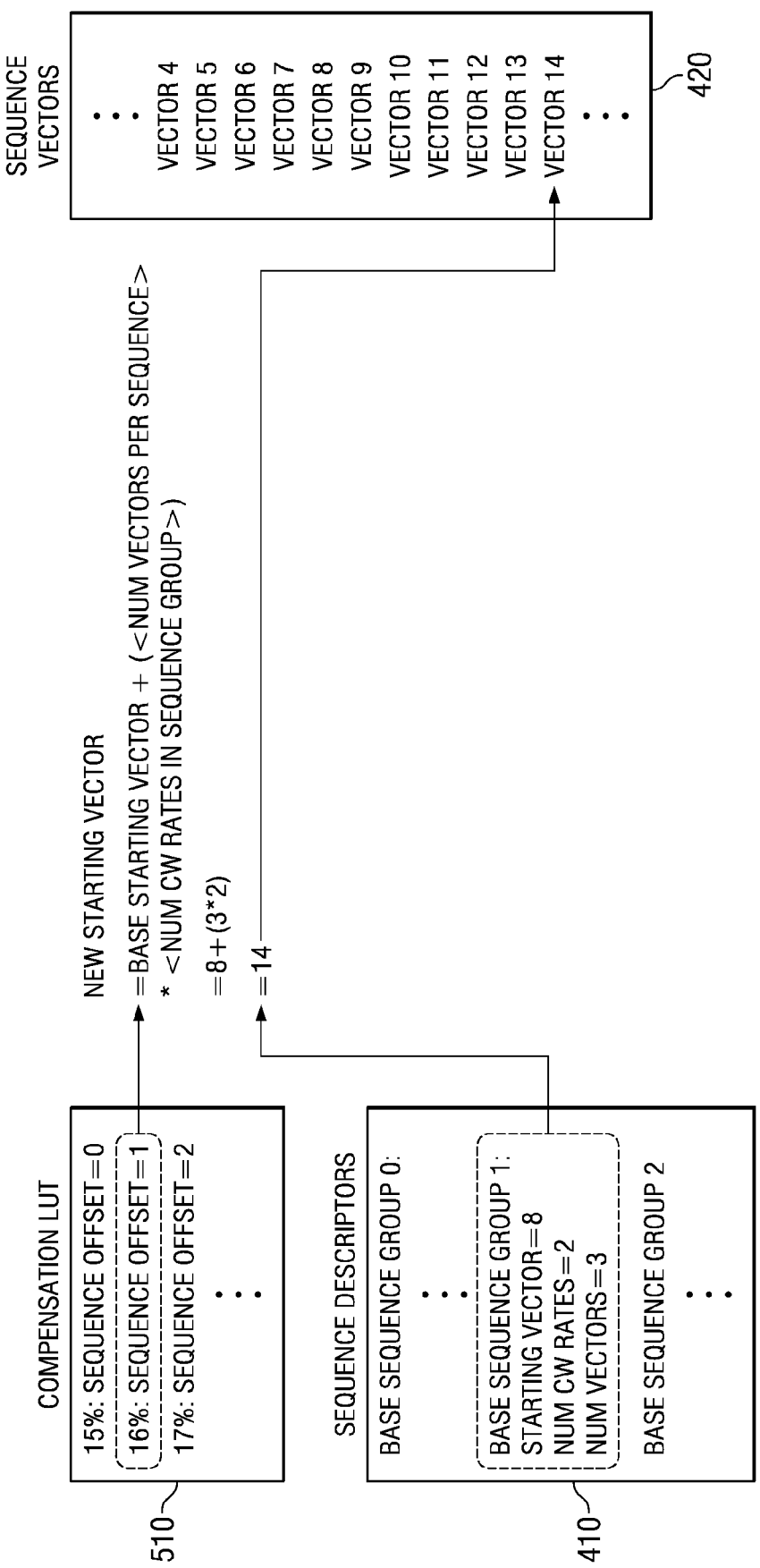
FIG. 5 illustrates an example of a way to generate a starting vector address carried out according to the principles of the invention.

FIG. 5 illustrates an example of a way to generate a starting vector address carried out according to the principles of the invention. The effective transmission factor (ND filter transmission*PPR) is assumed to be 16%. At 16%, the sequence lamp compensation LUT 510 indicates that an offset of 1 (from the current base sequence group, which is Base Sequence Group 1) should be used. In accordance with the Base Sequence Group 1 entry in the sequence descriptor table 410, the starting location of the sequence vector for a 16% effective transmission factor can be generated by first multiplying the number of color wheel rates in the sequence group (2) by the number of vectors per compensation sequence (3) and then adding the base starting vector (8). The result is 14, which points to Vector 14 in the sequence vector table 420 as FIG. 5 shows.

FIG. 6 illustrates a flow diagram of one embodiment of a method of increasing compensation sequence storage density and generating a starting vector address in an SLM system carried out according to the principles of the invention. The method begins in a start step 610. In a step 620, an offset address is calculated for a second (which may be a middle) compensation sequence portion located in the memory. As described above, the offset causes the second compensation sequence portion to be displaced from the first compensation sequence portion by an amount that is a function of a number of compensation sequence portions in a compensation sequence and a number of color-wheel spin rates supported. In a step 630, a first (which may be a beginning or base) compensation sequence portion is read from memory. In a step 640, a selected one of a plurality of second compensation sequence portions based on the offset address calculation performed in the step 620 is read from the memory.

In a step 650, an ending (base) compensation sequence portion is read from the memory if the second compensation sequence portion is merely the middle portion of the compensation sequence. In a step 660, the compensation sequence is constructed, typically by concatenating the first, or beginning compensation sequence portion, the selected second, or middle compensation sequence portion and, if present, the ending compensation sequence portion.

In a step 670, a DMD is driven using the compensation sequence. The method ends in an end step 680.

Although the invention has been described in detail, those skilled in the pertinent art should understand that they can make various changes, substitutions and alterations herein without departing from the scope of the invention in its broadest form.

What is claimed is:

1. A display system, comprising:
a color wheel having a plurality of filter segments including a neutral density filter segment;
a spatial light modulator having an array of pixel display elements with respective associated pixel memory cells, the pixel display elements being individually settable in response to data;
a lamp for projecting a beam of light sequentially through the different ones of the filter segments onto the spatial light modulator array as the color wheel rotates; circuitry for generating bit plane sequences of the data for setting the pixel display elements, including for generating neutral density bit plane sequences for modulation of the beam during projection through the neutral density filter segment; and
circuitry for loading the generated bit plane sequences of the data for setting the pixel display elements;
the circuitry for generating the bit plane sequences including a memory having a first look-up table for providing given bit plane sequences including given neutral density bit plane sequences corresponding to a given effective transmission factor for the neutral density filter segment; the effective transmission factor corresponding to a product of a transmission parameter of the neutral density filter and a pulse-to-plateau ratio of an amplitude of the beam during a maintenance pulse of the lamp to the amplitude of the beam in the absence of such pulse; and
the circuitry for generating the bit plane sequences further including a second look-up table in the sequence memory for providing compensation data, accessed based upon a current effective transmission factor, for providing compensated bit plane sequences including compensated neutral density bit plane sequences having unchanged portions provided by the first look-up table and changed portions provided by the second look-up table.

2. A display system, comprising:
a color wheel having a plurality of filter segments including a neutral density filter segment;
a spatial light modulator having an array of pixel display elements with respective associated pixel memory cells, the pixel display elements being individually settable in response to data loaded into the memory cells;
a lamp for projecting a beam of light sequentially through the different ones of the filter segments onto the spatial light modulator array as the color wheel rotates;
circuitry for generating bit plane sequences of the data for setting the pixel display elements based upon an image input signal, including for generating neutral density bit plane sequences for pulse-width modulation of the beam during projection through the neutral density filter segment; and
circuitry for loading the generated bit plane sequences of the data into the memory cells for setting the pixel display elements to modulate the beam according to the loaded sequences in synchronism with rotation of the color wheel;
the circuitry for generating the bit plane sequences including a sequence memory having a first look-up table for providing given bit plane sequences, accessed based upon information in the image input signal, including given neutral density bit plane sequences corresponding to a given effective transmission factor for the neutral density filter segment; the effective transmission factor corresponding to a product of a transmission parameter of the neutral density filter and a pulse-to-plateau ratio of an amplitude of the beam during a maintenance pulse of the lamp to the amplitude of the beam in the absence of such pulse; and
the circuitry for generating the bit plane sequences further including a second look-up table in the sequence memory for providing compensation data, accessed based upon a current effective transmission factor different from the given effective transmission factor, to substitute for portions of the given neutral density bit plane sequences for providing compensated bit plane sequences including compensated neutral density bit plane sequences having unchanged portions provided by the first look-up table and changed portions provided by the second look-up table;
whereby intensities to displayed images produced through modulation of the beam through the neutral density filter segment using the given neutral density bit plane sequences with the lamp operating at a condition providing the given effective transmission factor will be substantially maintained using the compensated neutral density bit plane sequences with the lamp operating at a condition providing the current effective transmission factor.

3. The system of claim 2, wherein the second look-up table provides a pointer for locating the corrective data in the apparatus memory.

4. The system of claim 2, wherein the given neutral density bit plane sequences comprise first and second data sequence portions stored at first addresses in the apparatus memory; and the corrected neutral density bit plane sequences comprise the unchanged portions provided by the first portions at the first addresses and the changed portions provided at second addresses specified by the second look-up table.

5. The system of claim 4, wherein the given neutral density bit plane sequences further comprise third data sequence portions stored following the first and second sequence portions, and the unchanged portions further comprise the third portions presented unchanged following the changed portions.

6. The system of claim 4, wherein the second look-up table specifies pointers for locating the second addresses.

7. The system of claim 6, wherein the pointer comprises an offset.

8. The system of claim 7, wherein the offset generates a starting vector for the changed portion by adding a current base sequence's starting vector to a product of multiplying the offset by a number of vectors in the current base sequence and further by a number of color wheel rates supported by the current base sequence.

9. The system of claim 2, wherein the pixel display elements comprise micro-mirrors.

10. A method for use with a display system, having:
a color wheel having a plurality of filter segments including a neutral density filter segment;
a spatial light modulator having an array of pixel display elements with respective associated pixel memory cells, the pixel display elements being individually settable in response to data loaded into the memory cells;
a lamp for projecting a beam of light sequentially through the different ones of the filter segments onto the spatial light modulator array as the color wheel rotates; and
circuitry for generating bit plane sequences of the data for setting the pixel display elements based upon an image input signal, including for generating neutral density bit plane sequences for pulse-width modulation of the beam during projection through the neutral density filter segment; and
circuitry for loading the generated bit plane sequences of the data into the memory cells for setting the pixel display elements to modulate the beam according to the loaded sequences in synchronism with rotation of the color wheel;
the method comprising:
providing given bit plane sequences by accessing, based upon information in the image input signal, a first look-up table in the circuitry for generating bit plane sequences; the given bit plane sequences comprising given neutral density bit plane sequences corresponding to a given effective transmission factor for the neutral density filter segment; the effective transmission factor corresponding to a product of a transmission parameter of the neutral density filter and a pulse-to-plateau ratio of an amplitude of the beam during a maintenance pulse of the lamp to the amplitude of the beam in the absence of such pulse; and
providing compensation sequence data by accessing, based upon a current effective transmission factor different from the given effective transmission factor, a second look-up table in the circuitry for generating the bit plane sequences;
substituting the compensation sequence data for portions of the given neutral density bit plane sequences to provide compensated bit plane sequences having unchanged portions provided by the first look-up table and changed portions provided by the second look-up table;
whereby intensities to displayed images produced through modulation of the beam through the neutral density filter segment using the given neutral density bit plane sequences with the lamp operating at a condition providing the given effective transmission factor will be substantially maintained using the compensated neutral density bit plane sequences with the lamp operating at a condition providing the current effective transmission factor.

11. The method of claim 10, wherein the second look-up table provides a pointer for locating the corrective data in the apparatus memory.

12. The method of claim 10, wherein the given neutral density bit plane sequences comprise first and second data sequence portions stored at first addresses in the apparatus memory; and the corrected neutral density bit plane sequences comprise the unchanged portions provided by the first portions at the first addresses and the changed portions provided at second addresses specified by the second look-up table.

13. The method of claim 12, wherein the given neutral density bit plane sequences further comprise third data sequence portions stored following the first and second sequence portions, and the unchanged portions further comprise the third portions presented unchanged following the changed portions.

14. The method of claim 12, wherein the second look-up table specifies pointers for locating the second addresses.

15. The method of claim 14, wherein the pointer comprises an offset.

16. The method of claim 15, wherein the offset generates a starting vector for the changed portion by adding a current base sequence's starting vector to a product of multiplying the offset by a number of vectors in the current base sequence and further by a number of color wheel rates supported by the current base sequence.

17. The method of claim 10, wherein the pixel display elements comprise micro-mirrors.

\* \* \* \* \*